United States Patent [19]

Nalepka et al.

[11] Patent Number: 5,449,202
[45] Date of Patent: Sep. 12, 1995

[54] METHOD AND APPARATUS FOR COLOR CODED LIBRARY AND SHELVED MEDIA SYSTEM

[76] Inventors: Michael D. Nalepka, 5051 NW. 58 Ter., Coral Springs, Fla. 33067; William H. Gunn, 1523 Butlercrest, Houston, Tex. 77080

[21] Appl. No.: 308,734

[22] Filed: Sep. 19, 1994

Related U.S. Application Data

[63] Continuation-in-part of Ser. No. 24,983, Jun. 24, 1994.

[51] Int. Cl.$^6$ .............................................. B42D 15/00
[52] U.S. Cl. ........................................ 283/81; 283/36; 283/42
[58] Field of Search .............................. 283/81, 36–43, 283/63.1, 55, 80

[56] References Cited

U.S. PATENT DOCUMENTS

| | | | |
|---|---|---|---|
| 4,204,639 | 5/1980 | Barber et al. | 235/462 |
| 4,329,191 | 5/1982 | Barber | 156/64 |
| 4,580,815 | 4/1986 | Barber | 283/81 |
| 4,585,253 | 4/1986 | Beisswanger | 283/39 |
| 4,846,503 | 6/1989 | Strauss | 283/70 |
| 4,856,820 | 8/1989 | Kasprzak et al. | 283/81 |
| 5,249,827 | 10/1993 | Olson | 283/42 X |

*Primary Examiner*—Willmon Fridie
*Attorney, Agent, or Firm*—Robert C. Kain, Jr.

[57] ABSTRACT

The method and apparatus for color coding library books and/or shelved media system that utilizes a plurality of color coded labels. Each label has a number of bands of horizontally disposed colors and each color in the color band is assigned to a unique letter, or number, forming part of the alpha-numeric library code and/or shelved media system. Each label further includes a removable spacing tab along its lower edge which, when the label is mounted to the designated book, the bottom edge of the removable spacing tab is aligned with the bottom edge of the spine of the book. Upon affixing the label to the book or the media case, the removable spacing tab is separated from the label by a horizontal separation joint, thereby aligning the bottom edge of the remaining portion of the label at a fixed position relative to the bottom of the book.

7 Claims, 4 Drawing Sheets

FIG. 2
FIG. 3
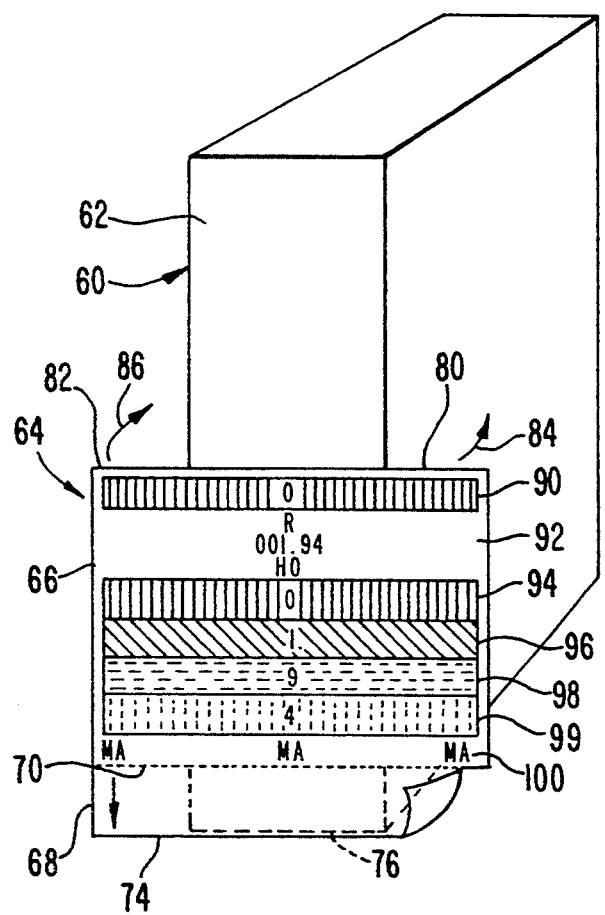
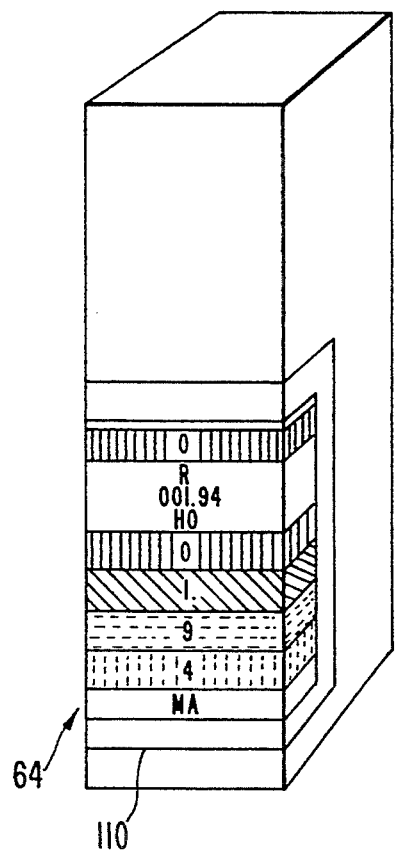

METHOD AND APPARATUS FOR COLOR CODED LIBRARY AND SHELVED MEDIA SYSTEM

This is a continuation-in-part of U.S. patent application Ser. No. 29/024,983 filed Jun. 24, 1994, now pending.

The present invention relates to a method and apparatus for color coding a library or a shelved media system such as a system for shelving VCR tapes, CD Rom cases or other types of shelved media.

BACKGROUND OF THE INVENTION

U.S. Pat. No. 4,204,639 to Barber et al. discloses a label used for color coding, organizing and codifying files, tapes, cassettes and similar articles by file number. Each numeral of the file number has a unique, visually recognized color coded label that is also machine readable. A misfiled article bearing these color coded labels stands out because it disrupts the otherwise consistent pattern of colors along the edges of coded articles employing the system.

U.S. Pat. No. 4,329,191 to Barber discloses a process for labeling a system of file folders. Each label has a printed set of indicia that identifies the file. The printed indicia is machine readable. Selected portions of the machine readable indicia are visually identifiable via color coded labels that correspond to the machine readable indicia.

U.S. Pat. 4,580,815 to Barber discloses a composite strip adapted to receive a color coded labeling system for organizing files by file number.

U.S. Pat. No. 4,585,253 to Beisswanger discloses an index system for file folders. The Beisswanger system utilizes four fields, a primary, secondary, and first and second tertiary fields. The primary field is four inches long, the secondary field is two inches long and the tertiary fields are each one inch long. Color coded indicia are placed in each field corresponding to an individual numeral of the file number. The variable length of the fields creates a funnel effect that leads the eye to the desired file.

U.S. Pat. No. 4,856,820 to Kasprzak et al. discloses a machine-readable and human-readable color coded pre-printed label. The machine-readable and color coded sections of the label are aligned side-by-side in a machine-readable column and a color coded column. Each segment of the color coded column bears a single numeral of the file number and its corresponding color. The labels are supplied in sheet form. Each sheet has a plurality of labels. The OCR labels may be affixed to books in library stacks.

U.S. Pat. No. 4,846,503 to Strauss discloses a method for obliterating undesired portions of a color coded label, leaving only information that is useful and desired.

OBJECT OF THE INVENTION

It is an object of the present invention to provide a method and apparatus for color coding library books and/or VCR tapes cases, CD Rom cases, or any other type of shelf arranged media.

It is a further object of the present invention to provide a color coded system which forms color block patterns due to the precise positioning of each color coded label on the spine of a book or media case.

It is a further object of the present invention to provide a method and apparatus for color coding a library and shelved media system which utilizes a removable spacing tab along the lower edge of the color coded label to precisely position the label on the spine of the book thereby insuring precise vertical label positioning on adjacent books or media case.

It is a further object of the present invention to provide a UV blocking plastic layer which is placed over the color coded label to preserve the colors. In the absence of the UV blocking plastic, certain printed colors in the color coded label may fade with time.

SUMMARY OF THE INVENTION

The method and apparatus for color coding library books and/or shelved media systems that utilizes a plurality of color coded labels. Each label has a number of bands of horizontally disposed colors and each color in the color band is assigned a unique letter, or number, forming part of the alpha-numeric library code or media identification system. Each label further includes a removable spacing tab along its lower edge which, when the label is mounted to the designated book or other media cases, the bottom edge of the removable spacing tab is aligned with the bottom edge of the spine of the book. Upon affixing the label to the book or other media case, the removable spacing tab is separated from the label by a horizontal separation joint, thereby aligning the bottom edge of the remaining portion of the label at a fixed position relative to the bottom of the book.

BRIEF DESCRIPTION OF THE DRAWINGS

Further objects and advantages of the present invention can be found in the detailed description of the preferred embodiment when taken in conjunction with the accompanying drawings in which:

FIG. 2 diagrammatically illustrates one color coded label before attachment of the label on the spine of the book;

FIG. 3 diagrammatically illustrates the color coded label affixed to the book and the UV blocking clear plastic layer over that label; and, FIG. 4 diagrammatically illustrates a sheet of labels and the indexing system on the sheet.

DETAILED DESCRIPTION OF THE PREFERRED EMBODIMENT

The present invention relates to a method and an apparatus for color coding a library and/or shelved media system.

Figure 1A:
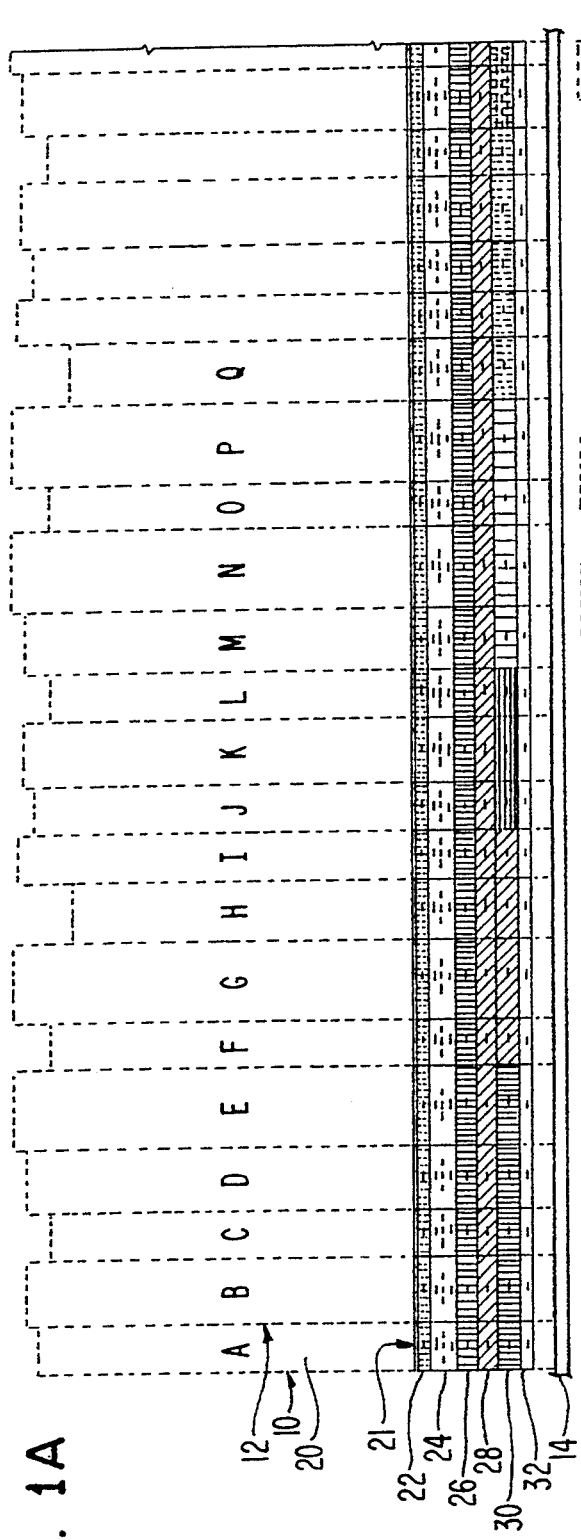
FIGS. 1A, 1B, 1C and 1D diagrammatically illustrate the plurality of color coded and labeled books stacked on book shelves to form color block patterns.
Figure 1B:
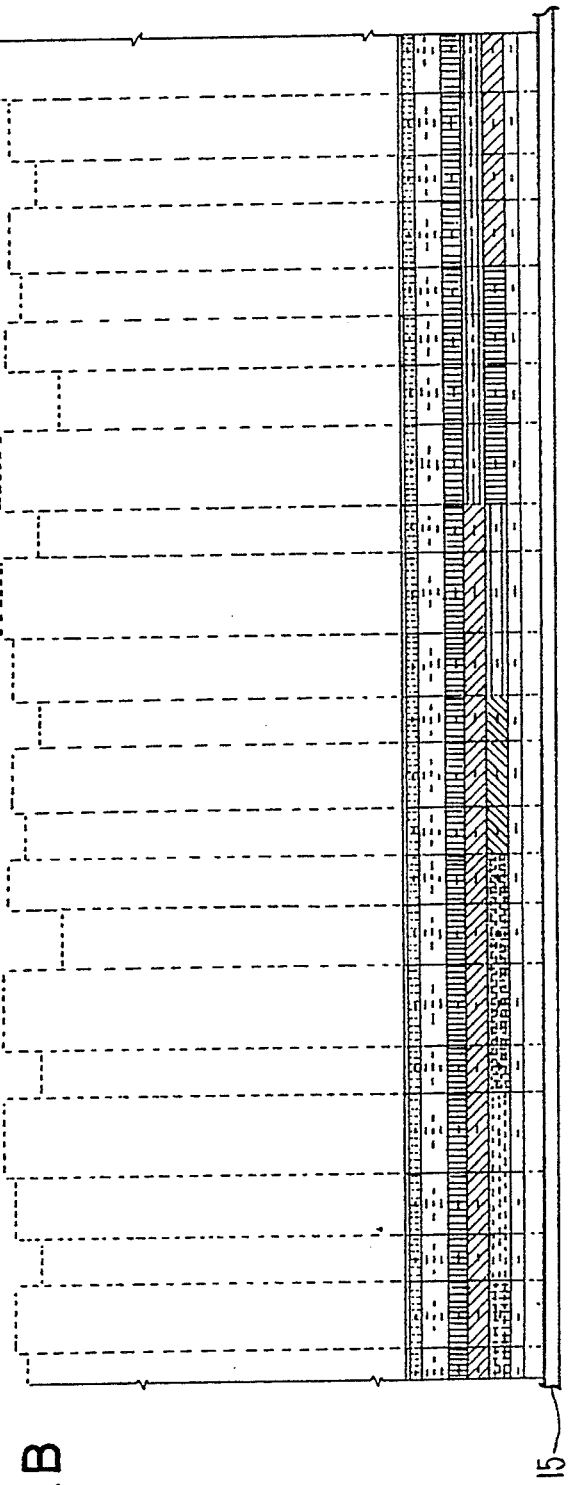
Figure 1C:
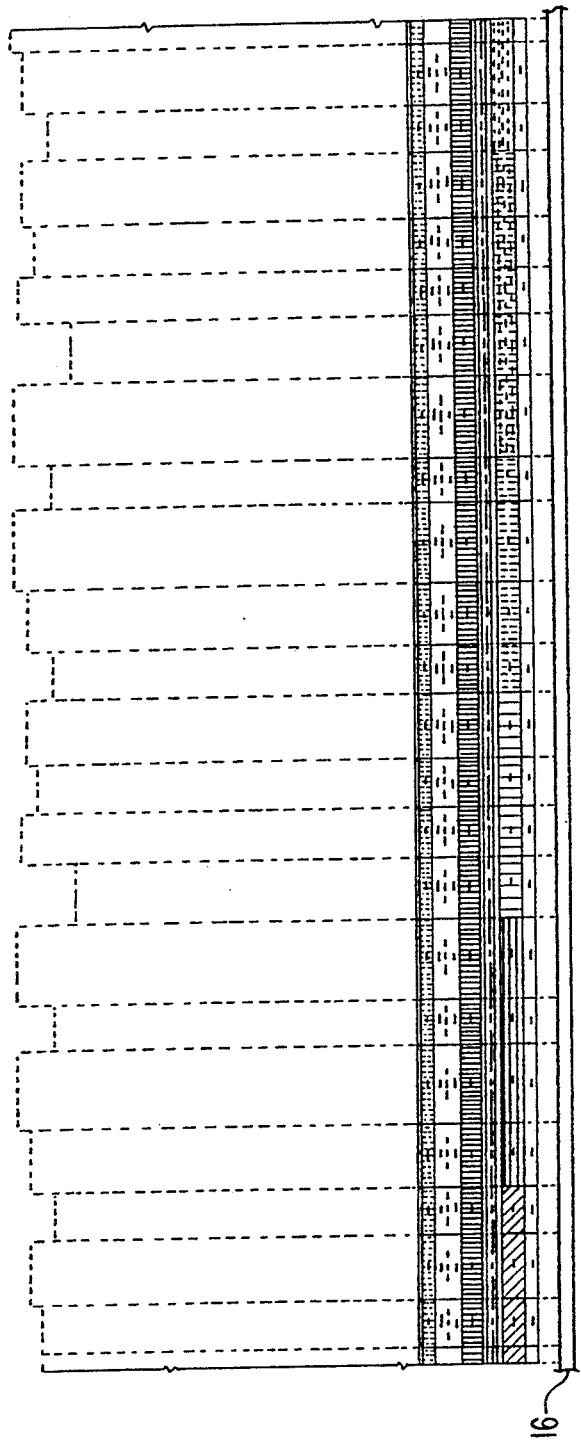
Figure 1D:
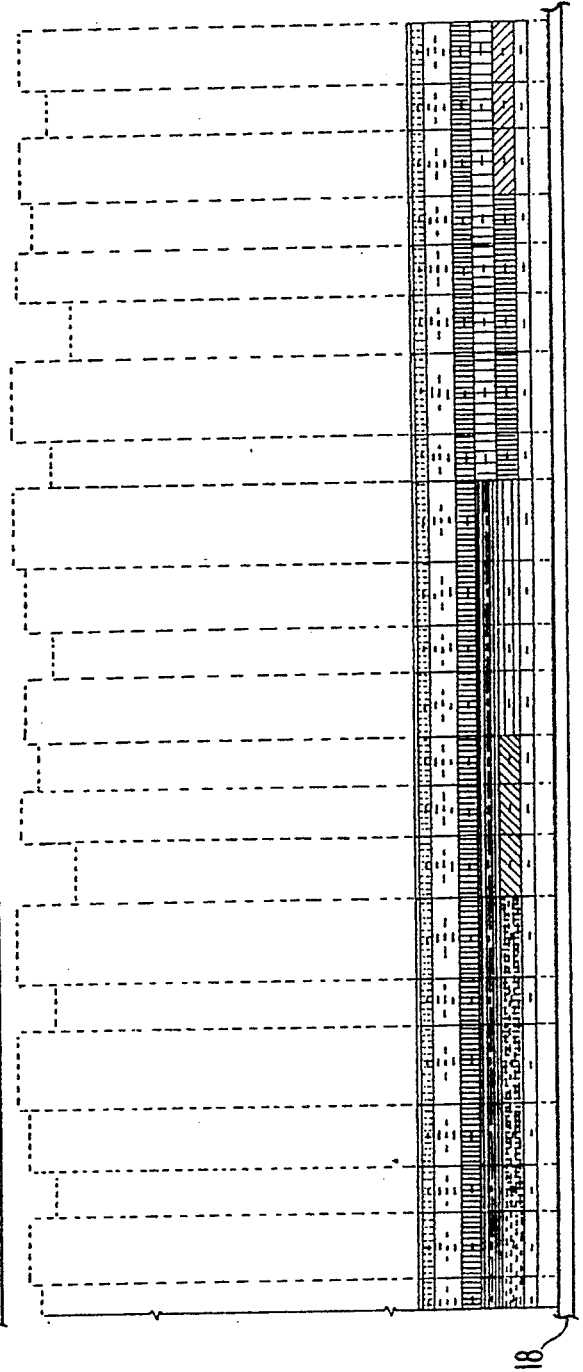

FIGS. 1A, 1B, 1 C, and 1D diagrammatically illustrate a plurality of books, two of which are identified as books 10 and 12 in FIG. 1A, which are stacked on a library shelf 14. Although books are illustrated in the drawings, the present invention may be used with shelved media cases. These media cases have spines visible to the library user when the case is on a shelf. Also, the case includes front and back covers as does a book. Library shelf 14 extends on as shelf system 15 (FIG. 1B), shelf 16 (FIG. 1C), and shelf 18 (FIG. 1D). As is common, the height of each book 10, 12 varies dependent upon a number of factors. In contrast, all the books are stacked on the shelf such that the front cover of one book is adjacent the back cover of another book. Each book also includes a spine, one of which is spine 20 for book 10.

Each book has attached thereto a color coded label. With respect to book 10, the color coded label includes color bands 22, 24, 26, 28, 30, and 32. These color bands are shown as purple, white, red, green, red and white color bands which are horizontally disposed on the label 21. As shown in the visual transition between the label on book E when compared with the label on book F, color band 30 changes from red (book E) to green (book F). These books, when stacked on a library shelf, form color block patterns which visually identify blocks and hence books of similar colors and groups of similar books. For example, with respect to books F, G, H and I, those books may have been authored by author Gary Smith. Hence, a similar color coding is noted. In contrast, books J, K and L may be authored by Jorge Smith. If book K was misfiled and placed between books F and G, the blue color band in region 30 would be visually identifiable between the two green color bands 30 on books F and G. Accordingly, a librarian, library assistant or file assistant could easily visually recognize a book which is not properly placed in the library. The present system enables the librarian to easily remove those books and place them in the correct order. The color chart set forth below provides one system of linking a certain color with an alpha-numeric number or letter which forms part of the library. In the color chart, the number 2 and the letter A are associated with a solid blue color and the letter N is associated with a stripe. In one embodiment, this stripe extends horizontally throughout the horizontally disposed color band. Of course, the stripe could be diagonally disposed rather than horizontally disposed. Also, the color chart set forth below simply provides an example of one type of designation of the alpha-numeric numbers and letters with certain colors.

| | Color Chart | | |
|---|---|---|---|
| Number | Alpha | Color Solid | Stripe |
| 0 | C-P | Red | (P) |
| 1 | B-O | Green | (O) |
| 2 | A-N | Blue | (N) |
| 3 | E-R | Pink | (R) |
| 4 | F-U | Purple | (U) |
| 5 | K-X | Yellow | (X) |
| 6 | M-Z | Black | (Z) |
| 7 | I-V | Orange | (V) |
| 8 | D-Q | Brown | (Q) |
| 9 | H-S | Gray | (S) |

As diagrammatically illustrated in FIGS. 1A, 1B, 1C and 1D, the color coding system is unique and is visually pleasing, even if the books are stacked completely horizontally or if certain books are horizontally disposed and other books are stacked vertically such as a four high library stack.

FIG. 2 diagrammatically illustrates book 60 having spine 62 upon which is partially mounted a color coded label 64. The label has an adhesive on its backside opposite the imprinted label side 66. This adhesive causes the label to adhere to spine 62 of the book. In order to precisely position label 64 on spine 62, each label has a removable spacing tab 68 attached to lower edge 70 of the imprinted portion 66. Spacing tab 68 is removably attached to printed portion 66 via horizontal separation joint which may consist of horizontal perforations, a horizontal tear crease or a plurality of vertical tear-through strips. Other types of separation joints commonly utilized with paper or other printable sheets may be utilized.

An important aspect of the present invention is the alignment of bottom edge 74 of spacing tab 68 with the bottom edge 76 of book 60. Bottom edge 76 is also the bottom edge of spine 62. Label 64 is properly spaced on spine 62 by aligning lower edge 74 of tab 68 with the bottom edge of spine 62. Label 64 is then attached to spine 62. Immediately thereafter or subsequent to attaching flap regions 80 and 82 to the front and back covers of book 60 (as shown by arrows 84, 86), spacing tab 68 is separated from label 64.

Another important aspect of the present invention is the printing of the library system alpha-numeric code horizontally in label portion 92. As shown in the color band charts for FIGS. 2 and 3 below, this color band 92 is white.

| Color Band Chart for FIGS. 2 and 3 | |
|---|---|
| 0 | Red |
| R-001.94-HO | White |
| 0 | Red |
| 1. | Green |
| 0 | Gray |
| 9 | Purple |
| MA | White (Main Library) |

In conjunction with the horizontal printing of the alpha-numeric library code for book 62 in color band region 92, the alpha-numeric library code is also printed vertically on label 64. Therefore, the library code 001.94 is printed as 001.94 vertically in color bands 90, 94, 96, 98, 99. These color bands further are color coded red, green, gray and purple which comply with the color assignments given these alpha-numeric characters in the color chart presented earlier. In color band region 100, additional characters can identify in what library branch the book is properly located. In FIG. 2, the book is located in the main branch.

FIG. 3 diagrammatically illustrates color coded label 64 which is further covered by a clear plastic 110 having an ultraviolet blocking or UV blocking effect. For certain printed inks or printed labels, it is important that the clear plastic UV blocking cover is adhered over the top of color label 64 because, with time, colors fade. Since it is costly to color code an entire library, the fading of colors is an expensive loss for the library system. When the colors fade, it may be difficult for a library user or librarian to distinguish between similar colors (for example, red and pink). With the UV block clear plastic layer, the fading of the colors is arrested. Other print systems do not fade when exposed to UV light for an extended period of time.

Figure 4:
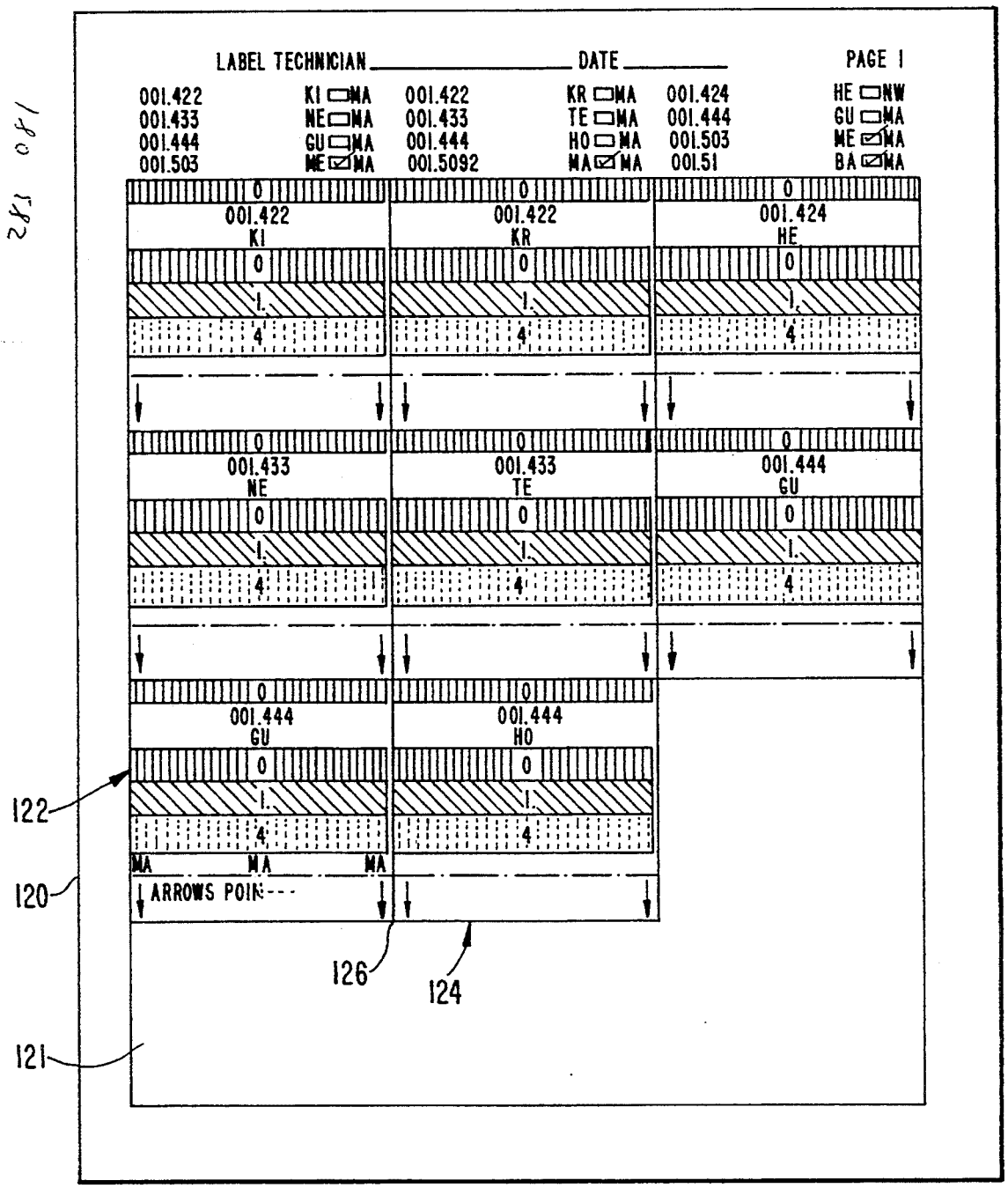

FIG. 4 diagrammatically illustrates a sheet 120 having a plurality of labels on it. Particularly, label 122 and label 124 will be discussed herein. All these labels are separated from each other by vertical cuts, such as cut 126 which separates label 122 from 124. A number of other labels have been removed from sheet 120. Those labels are identified above in the index with a check mark next to labels 001.503, 001.5092, 001.51 and 001.503. It should be noted that the positioning of the index corresponds with the spatial positioning of the missing label. Hence, for label 124, the index shows 001.44 in the middle column as the second entry from the bottom of the column. This corresponds with label 124 which is the position in the second column on the sheet in the second row from the bottom of the sheet.

This particular indexing portion on sheet 120 enables the librarian, who mounts each label onto the book, to check off the label after it has been affixed. Thereafter, the sheets can be mounted in three (3) binders and a listing is provided showing which labels have been accurately affixed to the proper book in the library. Sheet 120 has a releasable or weak type layer 121 which does not adhere to the adhesive on the backside of each label.

The claims appended hereto are meant to cover modifications and changes within the spirit and scope of the present invention.

What is claimed is:

1. In combination with a plurality of books stacked on a plurality of book shelves, each book having a spine attached and affixed between a front and a back cover of said book, said plurality of books stacked on said plurality of shelves with each respective spine facing a user and front and back covers of adjacent books being proximate each other, a color coded library system comprising:

a plurality of color coded labels, each label having (n) number of horizontally disposed color bands, each color band assigned to a unique letter or number and said letter or number being part of an alpha-numeric library code such that n number of color bands on a particular label is a subset of m available colors, each of said m available colors substantially equivalent to respective letters and numbers forming said alpha-numeric library codes, each label imprinted with a unique alpha-numeric library code both horizontally and vertically, at least a portion of said vertically imprinted unique alpha-numeric code being imprinted as a single letter or number over the corresponding assigned color band;

each label having a body portion with an adhesive on a backside of said body opposite an imprinted side of said body which reveals said n horizontal color bands and vertical and horizontal unique alpha-numeric code;

each label having a removable spacing tab along a lower edge of said imprinted side of said body, said spacing tab being removably affixed to said body via one of horizontal perforations, a horizontal tear crease and a plurality of vertical tear-through strips;

each label being mounted to a designated book by alignment of a bottom edge of said spacing tab with a bottom edge of said spine of said book, each label being substantially permanently attached on said spine via said adhesive, and a plurality of labels mounted on a plurality of adjacent, shelved books forming color block patterns by the uniformly placed labels mounted at predetermined positions on said plurality of shelved books, said color block patterns formed by a plurality of similar color bands on adjacent shelved books to form a visually identifiable block of similar colors; and, a clear layer of UV blocking plastic having an adhesive which attaches to said imprinted face.

2. In combination with a plurality of books or media cases stacked on a plurality of shelves, each book or case having a spine, a front cover plate and a back cover plate, each respective spine for said plurality of stacked and shelved books or case facing a user when front and back covers of adjacent books or cases are proximate each other, a color coded library system comprising:

a plurality of color coded labels each having n bands of horizontally disposed color bands, each color in said color band assigned to a unique letter or number forming a part of an alpha-numeric library code, each label imprinted with a unique alpha-numeric library code for each said book or case and at least a portion of said imprinted unique alpha-numeric code displayed as an assigned color in said color band;

each label having an imprinted face, an adhesive coated backside and a lower edge along said imprinted face, said n horizontal color bands forming said imprinted face;

each label having a removable spacing tab along said lower edge which is removably affixed via a horizontal separation joint to said imprinted face portion of said label;

each label being mounted to a designated book or case by alignment of a bottom edge of said spacing tab with a bottom edge of said spine of said book or case, said label placed at a predetermined location on said book or case with respect to said shelf after removal of said tab, thereby forming color block patterns which visually identify blocks of similar colors and groups of similar books or cases; and, a clear layer of UV blocking plastic having an adhesive which attaches to said imprinted face.

3. The combination as claimed in claim 2 wherein said unique alpha-numeric library code is imprinted both horizontally in a single color band and at least partially vertically, at least a group of unique letters or numbers displayed atop respective assigned colors.

4. A method of color coding and stacking a plurality of books stacked on a plurality of book shelves, each book having a spine, a front cover and a back cover, each respective spine for said plurality of stacked and shelved books facing a user when front and back covers of adjacent books are proximate each other, the method comprising the steps of:

assigning a color to each letter and number forming a part of an alpha-numeric library code;

providing a plurality of color coded labels each having n bands of horizontally disposed color bands;

providing each label with a removable spacing tab along a lower edge of said label, said spacing tab being removably affixed via a horizontal separation joint to said label;

imprinting each color coded label with a unique alpha-numeric library code corresponding to a respective book and at least a portion of said imprinted unique alpha-numeric code displayed as an assigned color in said color band;

adhering each label on a respective book corresponding to said unique alpha-numeric library code by (a) aligning a lower edge of said spacing tab with a lower edge of said spine of said book, and (b) removing said spacing tab from said label by separation along said separation joint; and, forming color block patterns with aligned color bands visually displaying books having similar characteristics when said books are stacked adjacent each other in accordance with said alpha-numeric library code on said book shelves.

5. A method for color coding as claimed in claim 4 including the step of printing said unique alpha-numeric codes on a plurality of color coded labels in sheet form.

6. A method for color coding as claimed in claim 5 including covering said color coded label with a UV blocking clear plastic shield which adheres to said book spine and said label after affixation of the label on the spine.

7. A method for color coding as claimed in claim 6 including providing an index on said sheet, said index including a list of all unique alpha-numeric library codes corresponding to respective labels found on said sheet prior to adherence to said book spine, and including the step of marking individual entries on said list when the corresponding label is adhered to said book spine.

* * * * *